UNITED STATES PATENT OFFICE.

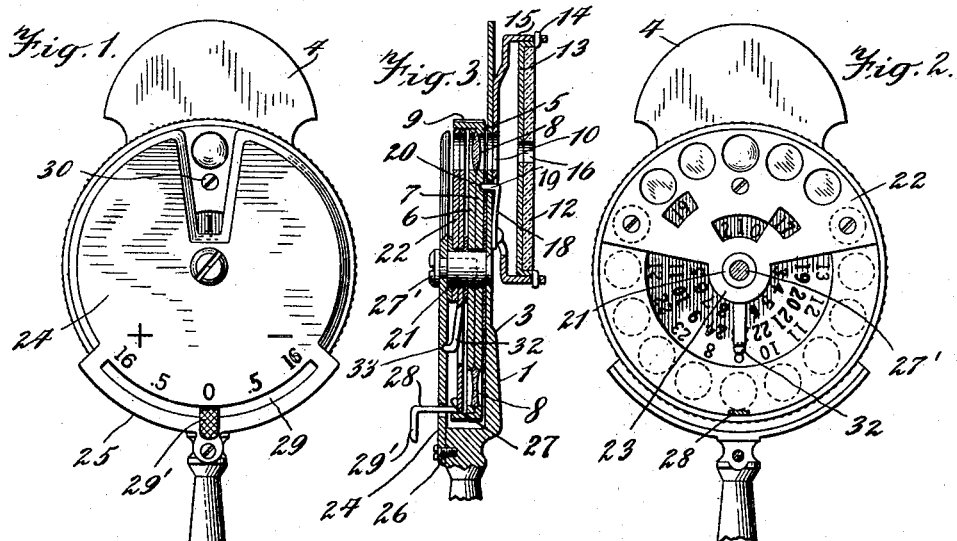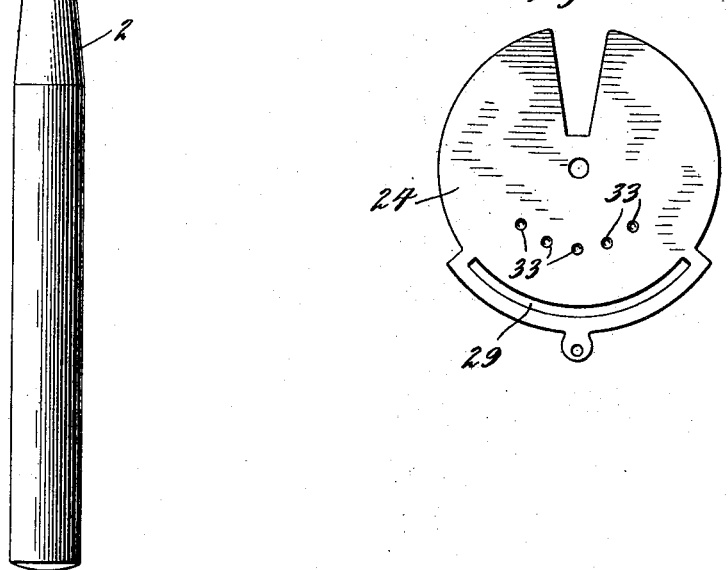

HANS CLEMENT, OF NEW YORK, N. Y., ASSIGNOR TO GENERAL OPTICAL COMPANY, INC., A CORPORATION OF NEW YORK.

OPHTHALMOSCOPE.

1,204,943.  Specification of Letters Patent.  Patented Nov. 14, 1916.

Application filed January 3, 1916. Serial No. 69,755.

*To all whom it may concern:*

Be it known that I, HANS CLEMENT, a citizen of the United States, residing at New York city, in the borough of the Bronx and State of New York, have invented certain new and useful Improvements in Ophthalmoscopes, of which the following is a full, clear, and exact description.

This invention relates to ophthalmoscopes and more particularly to improvements on the type of instrument known as the "Loring" ophthalmoscope.

As is well known, a "Loring" ophthalmoscope comprises a rear supporting plate upon which is mounted a lens carrier consisting of a rotary disk carrying the lenses and having a laterally projecting peripheral flange, the surface of which is knurled to permit the operator to rotate the same. Fitted within the flange of the main lens carrier is a supplementary lens carrier carrying several lenses which are adapted to be brought into alinement with the lenses of the main carrier and the sight opening in the supporting plate to give various combinations of plus and minus powers.

The object of this invention is to improve upon this type of instrument by providing a construction in which the supplementary lens carrier is adapted to be actuated to bring its various lenses in alinement with the sight opening by a construction which permits its manipulation without withdrawing the ophthalmoscope from the line of vision of the person making the test or requiring him to change the position of his hand, which holds the instrument.

Another object of the invention is to provide a construction in which all of the lenses of the supplementary lens carrier are nonexposed except when they are in alinement with the sight opening.

With these and other objects in view, the invention consists in providing a cover plate for the supplementary lens carrier, which entirely conceals and protects the same. This cover plate is provided with a slot through which one lens at a time may be exposed in a position in alinement with the sight opening.

The invention also consists in the means for rotating the supplementary lens carrier which comprises a finger secured to the supplementary lens carrier, which finger extends through a slot in the cover plate so as to be in a position adjacent the handle, which permits it to be moved by one of the fingers of the hand holding the instrument.

The invention will be understood from the description of an illustrated embodiment to be read in connection with the accompanying drawings, in which—

Figure 1 shows a front elevation of an ophthalmoscope constructed in accordance with the principles of my invention; Fig. 2 shows a similar view with the cover plate removed to more clearly show the parts; Fig. 3 is a central vertical section through the instrument; and Fig. 4 is a detail showing a rear plan of the cover plate.

As is the usual construction of "Loring" ophthalmoscopes, the lens carriers are supported upon a supporting plate 1, having a quadrant shaped flange at its lower end to which is secured a handle 2, so that the instrument may be conveniently held by the person examining the eye of the patient, the supporting plate 1 comprising a circular disk 3 having a shield 4 extending from its upper end. Mounted concentrically with the disk 3 is a main lens carrier 5 comprising a disk composed of two circular plates 6 and 7 between which the lenses 8 are held in place. The lenses are arranged in circular form adjacent the periphery of the carrier and any number of lenses may be used, but, as is the general practice, sixteen holes or apertures for lenses are provided, one of the apertures being left blank, while in the remaining fifteen apertures lenses whose powers range from +1 to +7 and from −1 to −8 are inserted. Extending laterally from the disk 7 of the lens carrier is a peripheral flange 9, the outer surface of which is knurled and projects slightly beyond the edge of the disk 3 of the supporting plate so that the knurled flange may be engaged by the thumb or finger of the person holding the instrument to rotate the lens carrier to bring the lenses carried thereby into alinement with a sight opening 10 formed in the supporting plate. Secured to the rear face of the supporting plate 3 is a mirror 12 mounted in a suitable frame 13 which has a trunnion bearing 14 in a yoke shaped piece 15 carried by the rear face of the supporting plate. As is obvious, a sight opening 16 is provided in the mirror and its frame in alinement with the sight opening 10 in the supporting plate. A spring finger 18 mounted on the rear face of the supporting plate has an end 19 projecting through the plate and is adapted to engage with a plurality of depressions or recesses 20 in the disk 7. These depressions are so spaced that the finger rests in one of them when a lens is in alinement with the sight opening, and by this construction any inadvertent movement of the lens carrier is prevented.

The lens carrier 5 is mounted upon a stationary stud 21 and mounted upon the same stud is a supplementary lens carrier 22. This carrier is formed by two quadrant shaped plates and has a bearing or hub 23 surrounding the stud. This supplementary lens carrier, as is the usual construction, is provided with five spaced circular openings, one of which is left blank while the other four are fitted with lenses whose powers are $+.5$ and $+16$, $-.5$ and $-16$, the supplementary lens carrier fitting within the peripheral flange 9 carried by the main lens carrier.

The lenses of the supplementary lens carrier and also the lenses of the main carrier are protected by a cover plate 24 having a quadrant shaped extension 25 which is secured to the quardant shaped flange of the supporting frame 1 by means of a set screw 26, the cover plate being also secured in place by a screw 27' threaded into the stud 21. This cover plate is circular in shape and is of slightly less diameter than the main lens carrier 5 so that the peripheral flange 9 will be exposed and its edge readily engaged by the person operating the ophthalmoscope. A segmental annular band 27 is secured at its ends to the quadrant shaped supplementary lens carrier. Secured to this annular band is a finger 28, which finger projects through a quadrant shaped slot 29 in the cover plate 24 thereof and has an angular extension 29', the surface of which is knurled and is adapted to be engaged by the thumb or finger of the person holding the ophthalmoscope. The cover plate 24 is provided in its upper part with a V-shaped slot 30 which permits one of the lenses of the supplementary lens carrier as well as the lens of the main lens carrier in alinement therewith to be exposed to view while all of the remaining lenses of the supplementary lens carrier are protected by the cover plate so that they cannot become blurred or soiled during the manipulation of the instrument. Secured to the hub 23 of the supplementary lens carrier is a spring finger 32, the end of which is adapted to engage a plurality of spaced depressions 33 arranged in circular form on the inner face of the cover plate to insure the alinement of the lenses of the supplementary lens carrier with the sight opening and to prevent inadvertent movement of the carrier. The V-shaped slot also permits the numerals designating the powers of the lens to be exposed to view through one of the openings 34 in the supplementary lens carrier, these numerals being arranged, as is the usual practice, so that the numeral exposed indicates the power of the lens or combination of lenses before the sight opening.

The operation of the instrument is obvious from its construction. The ophthalmoscope is held in the hand of the person examining the eye of the patient and to bring any lens whose power ranges from $-1$ to $-8$ or $+1$ to $+7$ into alinement with the sight opening the peripheral edge 9 is engaged by one of the fingers of the hand holding the instrument to cause a rotation of the main carrier. If a change in power of a half diopter either plus or minus is desired, or if it is desired to obtain a lens whose power is higher than $+7$ or $-8$, the supplementary lens carrier is moved by means of the finger 28 to bring the correct lens upon the supplementary lens carrier into alinement with the sight opening where it will be retained by the spring finger 32 engaging in one of the depressions 33. To so rotate the lens carrier the hand of the person holding the instrument may engage the finger 29 without shifting the position of the ophthalmoscope, since this finger is in a position adjacent the handle and can be readily reached without removing the instrument from the line of vision. Moreover, after a person has become accustomed to the instrument he can readily determine by the angular position of this finger which of the lenses of the supplementary lens carrier is in alinement with the sight opening. It will also be seen that all of the lenses with the exception of the one in alinement with the sight opening are protected by the cover plate, and hence cannot be soiled or blurred, as frequently occurs in the older types of ophthalmoscopes.

I claim:

1. In an ophthalmoscope, a supporting plate and a handle therefor, a main lens carrier and a supplementary lens carrier mounted concentrically on said plate, each carrier having a plurality of lenses therein adjacent its periphery adapted to be successively brought into alinement upon rotation of the carriers, a plate covering said supplementary lens carrier, said cover and supporting plates entirely concealing the lenses in the main and supplementary carriers, alining sight openings in the cover and supporting plates disposed at a point diametrically opposed to the point of attachment of the handle to the supporting plate, a knurled edge upon said main lens carrier projecting beyond the supporting and cover plates for rotating the main lens carrier, and a finger carried by the supplementary lens carrier projecting through a slot in the casing adjacent the handle.

2. In an ophthalmoscope, a supporting plate and a handle therefor, a main lens carrier and a supplementary lens carrier mounted concentrically on said plate, each carrier having a plurality of lenses therein adjacent its periphery adapted to be successively brought into alinement upon rotation of the carriers, a plate covering said supplementary lens carrier, said cover and supporting plates entirely concealing the lenses in the main and supplementary carriers, alining sight openings in the cover and supporting plates disposed at a point diametrically opposed to the point of attachment of the handle to the supporting plate, said supplementary carrier having its lenses only occupying a portion of a circumference and disposed adjacent the sight opening, a knurled edge upon said main lens carrier projecting beyond the supporting and cover plates for rotating the main lens carrier, and a finger carried by the supplementary lens carrier projecting through a slot in the casing adjacent the handle.

In witness whereof I subscribe my signature, in the presence of two witnesses.

HANS CLEMENT.

Witnesses:
FREDERICK L. HIGGINS,
AMELIA C. MOESCHEN.

Copies of this patent may be obtained for five cents each, by addressing the "Commissioner of Patents, Washington, D. C."